Patented May 28, 1929.

1,714,835

UNITED STATES PATENT OFFICE.

TATSUICHI YOKOYAMA, OF TOKYO-FU, JAPAN.

METHOD OF RECLAIMING VULCANIZED RUBBER.

No Drawing. Application filed July 15, 1927, Serial No. 206,139, and in Japan July 17, 1926.

The present invention relates to a method of reclaiming vulcanized rubber by dissolving the same in naphthaline hydrogenated compounds such as tetraline, hexaline, decaline, etc. in the presence of vulcanization accelerating agent or the substance which has strong chemical affinity with sulphur. The object of the invention is to collect reclaimed rubber simply from vulcanized rubber regarded as waste and utilize the same effectively as virgin rubber.

Part of the sulphur contained in vulcanized rubber is combined with rubber hydrocarbon as sulphide, while the remaining part diffuses in rubber particles and forms a solid solution. Hitherto, much has been said about methods of separating sulphur substance from waste vulcanized rubber, but they all have disadvantages as well as advantages. According to the method now in use, it is usual first to treat a powder of waste vulcanized rubber with an inorganic acid to remove part of the fibrous and other fillers and then to boil the same in alkali under pressure. However, the rubber thus desulphurized retains even a large quantity of solid sulphur not to speak of sulphur in solid solution, so that it merely expands when soaked in solvent like naphtha, but is not dissolved perfectly. It may be possible to decrease the quantity of the sulphur contained if the temperature for treatment is raised, but the rubber hydrocarbon will be injured very much and turned into a resinous substance, thus losing the quality peculiar to rubber, and therefore the product which is imperfectly reclaimed and insoluble in naphtha, etc. is only utilized by mixing a small quantity of it with virgin rubber. In the present invention pulverized vulcanized rubber is soaked in tetraline or other naphthaline hydrogenated compounds in the presence of a vulcanization accelerating agent. It is thrown into water after being dissolved by heating and then the solvent is removed therefrom by distillation or the like means, at the same time extracting sulphur. By thus effecting the desulphurization it is possible to remove the above drawback and regenerate the reclaimed rubber of almost the same peculiar quality with the virgin rubber, which is easily soluble in solvents like naphtha, etc., and which can be handled in the same way as virgin rubber. Such naphthaline hydrogenated compounds as tetraline (tetra-hydronaphthaline), hexaline (hexahydronaphthaline) and decaline (deca-hydro-naphthaline), when heated, dissolve not only vulcanized rubber, but dissolve the sulphur which is present in solid solution and also a large part of the combined sulphur. In the presence of vulcanization accelerating agents and other substances which easily combine with sulphur, a greater part of the sulphur combined with rubber substance to say nothing of free sulphur is liberated and transformed into sulphides or the like. Now, the vulcanization accelerating agent has many kinds and functions, but as a general thing it combines with sulphur below the temperature for the vulcanization of rubber and transfers sulphur to rubber substance in the most active condition. In other words, it is what is termed "sulphur carrier", so the vulcanization accelerating agent is in a sense no other than a substance which easily combines with sulphur, and in the present invention although most of the substances commonly recognized as vulcanization accelerating agents can be employed, it is preferable to select those which have strong affinity for sulphur such as strong bases, alcoholate of alkalies (alkali ethylate), aniline bases, alkali metals or iron or zinc powder. Especially, such substances as sodium alcoholate and sodium anilide which easily combine with sulphur and are soluble in a solvent like tetraline, etc. are greater in efficiency. Any way, if the sulphur compounds formed as a result of reaction with these substances is soluble in water, it is extracted with water when solvent like tetraline, etc. is separated, and is removed from reclaimed rubber. Even if insoluble matter like sulphide of heavy metal may be intermingled with reclaimed rubber as it sometimes happens, it does not affect vulcanization and therefore it does not matter industrially if it is not separated, because it is only present as a mere body.

In this invention the velocity and temperature for a solvent like tetraline to dissolve vulcanized rubber may vary according to the kind of the latter, but black vulcanized rubber containing 3.6% of free sulphur and 3% of combined sulphur is completely dissolved in the presence of a small quantity of a strong vulcanization accelerating agent if held for four hours at a temperature between 125 and 130° C. Also, at a temperature over 170° C. and near the boiling point it is dissolved within an hour. However, as a treatment at a high temperature is apt to destroy rubber composition and give sticky nature to the product, it is preferable to use a low temperature except in particular cases.

The following are examples of carrying this invention into practice:—

1. Pulverize black inner tube of bicycles (3% of combined sulphur) by roller and remove a large part of the free sulphur therefrom beforehand by soaking the above in a concentrated solution of caustic soda for about one day and night. Then after washing the same with water, dry and treat the same in the following proportions:—

|   | Grams. |
|---|---|
| Pulverized inner tube | 150 |
| Detraline (or decaline) | 300 |
| Metallic sodium | 1 |
| Alcohol | 1 |

(Metallic sodium acts with alcohol and forms sodium ethylate, which is soluble in tetraline). Stir up and desulphurize the above by heating the same under pressure for four hours at about 135 to 140° C. Then, throw the same into water and distill tetraline, etc. by blowing steam thereinto, and sulphides will be extracted in the water and the desulphurized rubber float in insoluble condition. Collect and wash this with water. After drying it, knead it with roller.

The product thus obtained contains about 2.3% of combined sulphur and is not very sticky. It is high in elasticity and dissolves completely in naphtha. It can be vulcanized further under the same condition as virgin rubber and manufactured into rubber articles.

2. Sodium alcoholate superabundant as compared with that of the preceding example was added to pulverized inner tube of automobile tires containing 2.5% of combined sulphur and after mixed with tetraline in twice the quantity of the rubber it was heated for ten hours at 160–170° C. The operation as mentioned in the preceding example was made and it was possible to obtain a product containing 0.95% of combined sulphur.

The following is the result of the experiment of vulcanization made further upon reclaimed rubber:—

| Reclaimed rubber | 100 parts. |
|---|---|
| Zinc oxide | 2 parts. |
| Sulphur flower | 2.5 parts. |
| Sodium anilide | 0.5 parts. |
| Temperature for vulcanization | 115° C. |
| Time for vulcanization | 45 minutes. |

The inventor has found that the product was perfectly vulcanized and is almost the same as if virgin rubber were used.

I claim:

1. The method of reclaiming vulcanized rubber which comprises treating the rubber with a hydrogenated naphthaline rubber solvent containing dissolved therein a substance having a strong affinity for sulphur.

2. The method of reclaiming vulcanized rubber which comprises treating the rubber with a hydrogenated naphthaline rubber solvent in the presence of a vulcanization accelerator.

3. The method of reclaiming vulcanized rubber which comprises treating the rubber with tetraline containing a sodium compound reactive with sulphur to form sulphides.

4. The method of reclaiming vulcanized rubber which comprises treating the rubber with tetraline containing dissolved sodium alcoholate.

5. The method of reclaiming vulcanized rubber which comprises dissolving pulverized vulcanized rubber in a hydrogenated naphthaline rubber solvent in the presence of a substance having a strong affinity for sulphur, heating the solution, thereafter treating the solution with water and separating rubber therefrom.

In testimony whereof I have affixed my signature.

TATSUICHI YOKOYAMA.